United States Patent
Spracklen et al.

(10) Patent No.: US 7,793,044 B1
(45) Date of Patent: Sep. 7, 2010

(54) EFFICIENT CACHING OF STORES IN SCALABLE CHIP MULTI-THREADED SYSTEMS

(75) Inventors: Lawrence A. Spracklen, Boulder Creek, CA (US); Yuan C. Chou, Mountain View, CA (US); Santosh G. Abraham, Pleasanton, CA (US)

(73) Assignee: Oracle America, Inc., Redwood City, CA (US)

( * ) Notice: Subject to any disclaimer, the term of this patent is extended or adjusted under 35 U.S.C. 154(b) by 94 days.

(21) Appl. No.: 11/654,150

(22) Filed: Jan. 16, 2007

(51) Int. Cl.
*G06F 13/00* (2006.01)
*G06F 13/28* (2006.01)

(52) U.S. Cl. .............................. 711/118; 711/E12.041; 711/E12.069

(58) Field of Classification Search .................. 711/118, 711/E12.041, E12.069
See application file for complete search history.

(56) References Cited

U.S. PATENT DOCUMENTS

| | | | | |
|---|---|---|---|---|
| 4,445,174 A | * | 4/1984 | Fletcher | 711/121 |
| 5,317,716 A | * | 5/1994 | Liu | 711/144 |
| 5,694,573 A | * | 12/1997 | Cheong et al. | 711/122 |
| 6,393,525 B1 | * | 5/2002 | Wilkerson et al. | 711/136 |
| 6,681,293 B1 | * | 1/2004 | Solomon et al. | 711/122 |
| 2004/0039880 A1 | * | 2/2004 | Pentkovski et al. | 711/146 |
| 2007/0186050 A1 | * | 8/2007 | Luick | 711/137 |

OTHER PUBLICATIONS

Chou et al., U.S. Appl. No. 11/472,141, filed Jun. 20, 2006, entitled "Efficient On-Chip Instruction and Data Caching for Chip Multiprocessors".

* cited by examiner

*Primary Examiner*—Matt Kim
*Assistant Examiner*—Edward J Dudek, Jr.
(74) *Attorney, Agent, or Firm*—Gunnison, McKay & Hodgson, L.L.P.; Philip McKay

(57) ABSTRACT

In accordance with one embodiment, an enhanced chip multiprocessor permits an L1 cache to request ownership of a data line from a shared L2 cache. A determination is made whether to deny or grant the request for ownership based on the sharing of the data line. In one embodiment, the sharing of the data line is determined from an enhanced L2 cache directory entry associated with the data line. If ownership of the data line is granted, the current data line is passed from the shared L2 to the requesting L1 cache and an associated enhanced L1 cache directory entry and the enhanced L2 cache directory entry are updated to reflect the L1 cache ownership of the data line. Consequently, updates of the data line by the L1 cache do not go through the shared L2 cache, thus reducing transaction pressure on the shared L2 cache.

6 Claims, 10 Drawing Sheets

EFFICIENT CACHING OF STORES IN SCALABLE CHIP MULTI-THREADED SYSTEMS

BACKGROUND OF THE INVENTION

1. Field of the Invention

The present invention relates generally to enhancing the performance of computer processors, and more particularly to methods for reducing the redundant storage of data in caches of chip multiprocessors (CMPs).

2. Description of Related Art

A conventional chip multiprocessor (CMP) is a computer processor composed of two or more single-threaded or multi-threaded processor cores on a single chip. Typically each processor core of the CMP includes at least one first level cache, herein referred to as an L1 cache, and/or a core cache. An L1 cache can be further subdivided into L1 sub-caches, such as an instruction (I) cache and a data (D) cache.

The processor cores typically share a single second level cache, herein referred to as a shared L2 cache, also on the chip. The shared L2 cache allows for data communication and data sharing between threads running on different processor cores. Some shared L2 caches are further subdivided into L2 sub-caches, sometimes referred to as banks. Typically, communication occurs between the L1 caches of the processor cores and the shared L2 cache via a crossbar. Where a shared L2 cache is banked, the crossbar determines the bank to be accessed in the shared L2 cache.

A cache, such as an L1 cache and a shared L2 cache, is a memory structure that stores data for use by the CMP. As used herein the term data refers to program data, and to program instructions. Typically a cache is smaller in storage capacity than a main memory of a computer system, and stores copies of data and instructions from main memory that are more frequently used by a CMP.

As a cache is usually closer to the processor core than a main memory of a computer system, the data in the cache is typically accessed more quickly than an access of the same data from main memory. For example, in a conventional CMP, the L1 caches and the shared L2 cache are typically on the same chip allowing for faster data access than an access of the same data from main memory.

Data stored in a cache is typically stored in a data store area of the cache, and the stored data is commonly referred to as a data line or a cache line. The cache further includes a cache directory that includes one or more cache directory entries that individually reference a different data line stored in the cache.

In conventional CMPs, each data line stored in an L1 cache has an associated L1 cache directory entry in the L1 cache directory that identifies the data line and where the data line is stored in the L1 data store of the L1 cache. Similarly, each data line stored in a shared L2 cache has an associated L2 cache directory entry in the shared L2 cache directory that identifies the data line and where the data line is stored in the shared L2 cache. Conventionally, data that is used by a requesting processor core and not used by other processor cores, is termed private data, whereas data that is used by more than one processor core is termed shared data.

A conventional L1 cache directory entry in an L1 cache of a conventional CMP typically includes a valid value followed by a tag value. The valid value, for example, one or more bits, indicates whether the data line in the L1 cache is valid or not valid.

For example, a valid data line is a data line that is the current version or state of the data line, and can be used by a processor core. Conversely, an invalid data line is a data line that is not the current version or state of the data line, and cannot be used by the processor core without first updating the data line.

The tag value, for example, forty (40) bits, identifies a data line and the location of the data line in the L1 cache data store. Valid values and tag values in conventional L1 cache directory entries are well known to those of skill in the art and are not further described herein to avoid detracting from the principles of the present invention.

A conventional shared L2 cache directory entry in a conventional shared L2 cache of a conventional CMP typically includes a memory coherence protocol (MCP) value followed by a tag value identifying a particular data line.

The MCP value, for example, one or more bits, indicates one or more memory states of the associated data line in accordance with a particular cache memory coherence protocol. Examples of memory coherence protocols include MOESI, MSI, MESI, and MOSI protocols.

The tag value, for example, forty (40) bits, identifies a data line and the location of the data line in the shared L2 cache data store. Memory coherence protocols and tag values in conventional shared L2 cache directory entries are well known to those of skill in the art and are not further described herein to avoid detracting from the principles of the present invention.

Typically, conventional L1 caches are either write-through caches or write-back caches. If a requesting L1 cache is a conventional write-through cache, all data to be stored is written to the shared L2 cache. The requesting L1 cache has no ability to store the modified data.

The version of the data in the requesting L1 cache can be updated, but the data line is owned by and stored in the shared L2 cache. Thus, stored data is held in both the requesting L1 cache and in the shared L2 cache. When the stored data is private to the requesting L1 cache, the shared L2 cache is polluted with the private data.

Different from a write-through cache, if a requesting L1 cache is a conventional write-back cache, all data to be stored is initially written to the requesting L1 cache. The shared L2 cache may or may not have had a copy of the data, but the copy is an old copy as the newest copy is owned by and stored in the requesting L1 cache.

If another processor core needs the stored data, the other processor core has to obtain the data from the storing L1 cache via the shared L2 cache. Thus, the data stored in the L1 cache is now shared data and a requesting L1 cache, must transact through the shared L2 cache to obtain the data, and further the shared L2 cache is polluted with old copies of the data.

Thus, in conventional CMP designs, each processor core can retain private data in the shared L2 cache in addition to retaining the private data in the processor core's own L1 cache. Consequently, competition for storage space in the shared L2 cache increases as private data of one processor core competes with private data of another processor core for the limited space in the shared L2 cache. This competition for storage space in the shared L2 cache can lead to an increase in the L2 cache miss rate if there is not enough storage space for a requested data line in the shared L2 cache.

Further, a processor core that issues many unused prefetches of data can pollute the shared L2 cache with storage of unused data and displace the storage of more useful data for other processor cores from the shared L2 cache, again leading to an increase in the L2 cache miss rate. An increase in the L2 cache miss rate in turn leads to an increase in off-chip bandwidth usage to retrieve the requested data, such as from an L3 cache or from main memory, which can lead to an increase in the L2 cache miss latency. Increases in the L2 cache miss rate and in the L2 cache latency are usually highly detrimental to a CMP's performance.

As most stores of data are of data that is private to a strand, the current protocols are wasteful of on-chip resources. Further, as all stores in each strand and each core conventionally go through the shared L2 cache, a growing amount of transaction pressure is placed on the cross bar and the shared L2 cache.

SUMMARY OF THE INVENTION

In accordance with one embodiment, an enhanced chip multiprocessor includes a method including: receiving a trigger event associated with a data line, and determining whether reuse of the data line by a first level (L1) cache is likely. Upon a determination that reuse of the data line by the L1 cache is likely, a request for ownership of the data line is sent to a shared second level (L2) cache, the request for ownership of the data line identifying the data line and requesting ownership of the data line from the shared L2 cache.

A request response is received from the shared L2 cache, the request response indicating whether or not the request for ownership of the data line is granted. When the request for ownership of the data line is granted, the data line is received from the shared L2 cache. The data line is installed in the L1 cache and an enhanced L1 cache directory entry indicating ownership of the data line by the L1 cache is generated.

In accordance with one embodiment, the enhanced chip multiprocessor further includes a method including: receiving a request for ownership of a data line from a requesting first level (L1) cache. An enhanced second level (L2) cache directory entry associated with the data line is accessed and a determination is made whether a copy of the data line is stored in another L1 cache.

Upon a determination that a copy of the data line is not stored in another L1 cache, a request response is sent granting ownership of the data line to the requesting L1 cache and the data line is sent to the requesting L1 cache. A determination is made whether or not the data line is stored in the shared L2 cache. Upon a determination that the data line is stored in the shared L2 cache, the data line is invalidated in the shared L2 cache, and an enhanced L2 cache directory entry is generated indicating the data line is stored in the requesting L1 cache.

Alternatively, upon a determination that the copy of the data line is stored in another L1 cache, a request response is sent denying ownership of the data line to the requesting L1 cache. A determination is made whether or not the data line is owned by another L1 cache. Upon a determination that the data line is owned by another L1 cache, a revocation of the ownership of the data line is sent to the another L1 cache. The data line is received from the another L1 cache, and installed in the shared L2 cache. An enhanced L2 cache directory entry is generated indicating the data line is not owned by an L1 cache.

In accordance with one embodiment, the enhanced chip multiprocessor further includes a method including: receiving a revocation of ownership of a data line owned by a first level (L1) cache; sending the data line to a shared second level (L2) cache; and generating an enhanced first level (L1) cache directory entry associated with the L1 cache indicating the data line is not owned by the L1 cache.

In one embodiment, the enhanced chip multiprocessor permits an L1 cache to request ownership of a data line from a shared L2 cache. The shared L2 cache evaluates the ownership request from the L1 cache and determines whether to deny or grant the request for ownership based on the sharing of the data line. In one embodiment, the sharing of the data line is determined from an enhanced L2 cache directory entry associated with the data line.

If ownership is granted, the current data line is passed from the shared L2 to the requesting L1 cache and an associated enhanced L1 cache directory entry and the enhanced L2 cache directory entry are updated to reflect the L1 cache ownership of the data line. Consequently, updates of the data line by the L1 cache do not go through the shared L2 cache, thus reducing transaction pressure on the shared L2 cache. If ownership is denied, the data line remains owned by the shared L2 cache for use by other processor cores.

BRIEF DESCRIPTION OF THE DRAWINGS

The accompanying drawings, which are incorporated in, and constitute a part of this specification, illustrate embodiments of the invention and together with the description, serve to explain the principles of the invention. In the drawings the term "cache" is represented with a dollar sign "$", and the term "directory" is abbreviated as "DIR". In the drawings.

DETAILED DESCRIPTION

Herein the term data refers to both program data as well as program instructions. Further herein data is also referred to as a data line. Further herein the term L1 cache refers collectively to any sub-caches of an L1 cache, such as an I cache and a D cache. Further herein the term shared L2 cache refers collectively to any sub-caches of a shared L2 cache, such as an L2 cache bank.

Figure 1:
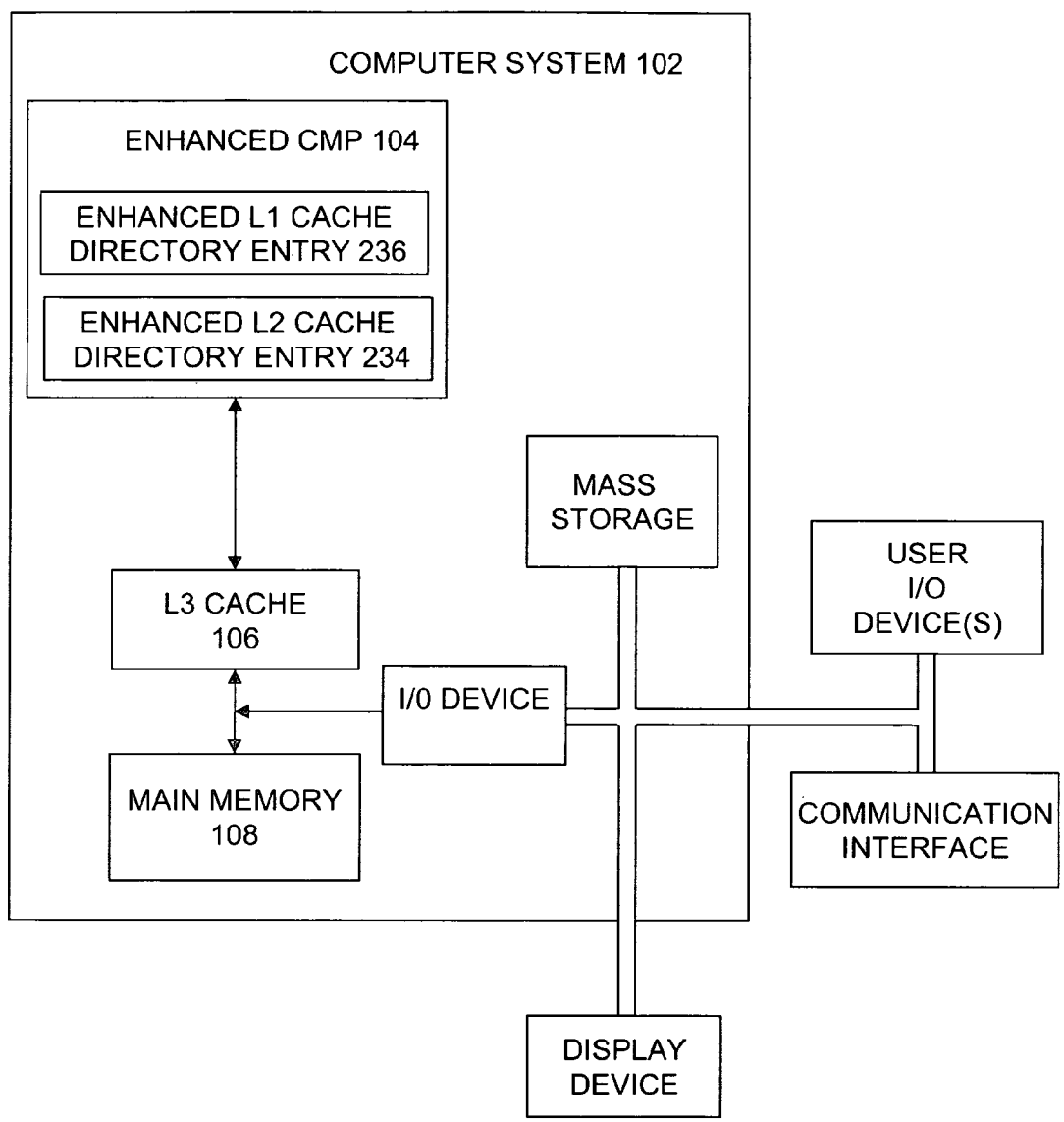
FIG. 1 illustrates a block diagram of a computer system including an enhanced chip multiprocessor (CMP) in accordance with one embodiment of the invention.

FIG. 1 illustrates a block diagram of a computer system 102 including an enhanced chip multiprocessor (CMP) 104 in accordance with one embodiment of the invention. Referring now to FIG. 1, computer system 102 includes enhanced CMP 104 that executes program code, such as application code for method 500, method 600, and method 700. In one embodiment, enhanced CMP 104 requests data as needed from L3 cache 106 and/or from main memory 108, and stores the requested data in one or more on-chip caches.

In one embodiment, enhanced CMP 104 permits a requesting L1 cache to obtain ownership of a data line from a shared L2 cache for data private to the requesting L1 cache, but retains ownership of a data line in the shared L2 cache when the data is shared by more than one L1 cache. In one embodiment, ownership of a data line by an L1 cache is revocable by the shared L2 cache.

Figure 2:
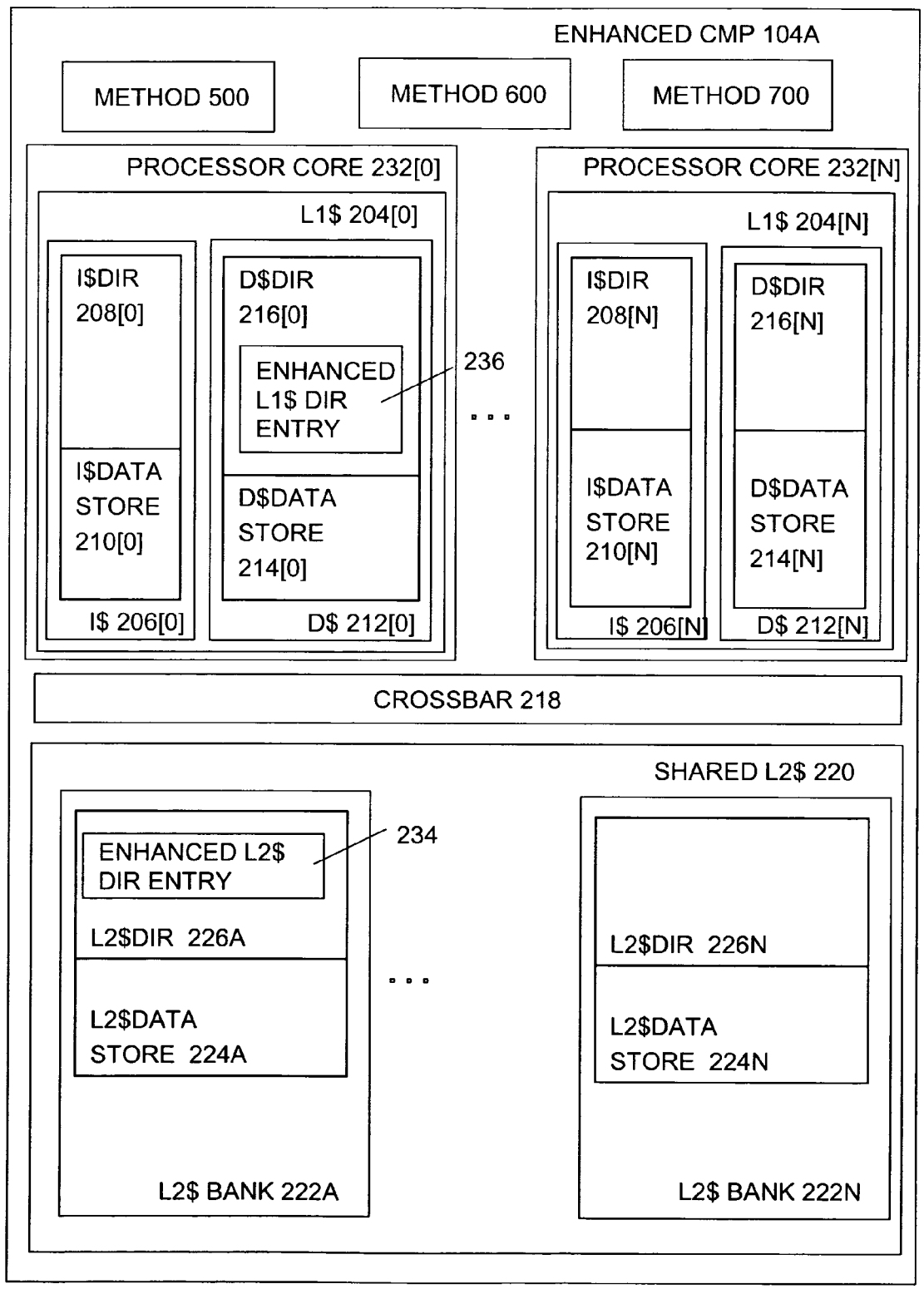
FIG. 2 illustrates a block diagram of the enhanced chip multiprocessor (CMP) of FIG. 1 in accordance with one embodiment of the invention.

FIG. 2 illustrates a block diagram of enhanced chip multiprocessor (CMP) 104 of FIG. 1 in accordance with one embodiment of the invention. Referring now to FIG. 2, in one embodiment, enhanced CMP 104A includes one or more processor cores 232 [0]-232 [N]. Each processor core 232 [0]-232 [N] further includes at least one first level cache, or core cache, herein termed an L1 cache, i.e., respectively, L1 caches 204 [0]-204 [N]. For example, processor core 232 [0] includes an L1 cache 204 [0].

In one embodiment, each L1 cache further includes one or more sub-caches, such as an I cache and a D cache. For example, L1 cache 204 [0] includes an I cache 206 [0] and a D cache 212 [0].

In the present embodiment, each sub-cache of an L1 cache includes an L1 cache directory and an L1 cache data store. For example, I cache 206 [0] includes at least an I cache directory 208 [0] and an I cache data store 210 [0]. In one embodiment, I cache directory 208 [0] stores entries that identify the location of data lines stored in I cache data store 210 [0]. D cache 212 [0] includes at least a D cache directory 216 [0] and a D cache data store 214 [0]. D cache directory 216 [0] stores entries that identify the location of data lines stored in D cache data store 214 [0].

In one embodiment, each L1 cache 204 [0]-204 [N] can include at least one enhanced L1 cache directory entry, e.g., enhanced L1 cache directory entry 236, that identifies a data line stored in the associated L1 cache data store. For example, as illustrated in FIG. 2, L1 cache 204 [0] includes an enhanced L1 cache directory entry 236A in D cache directory 216 [0] for a data line stored in D cache data store 214 [0]. Similarly L1 cache 204 [0] can include an enhanced L1 cache directory entry (not shown) in I cache directory 208 [0] for a data line stored in I cache data store 210 [0].

In one embodiment, an enhanced L1 cache directory entry, e.g., enhanced L1 cache directory entry 236A, includes an owned value that indicates whether or not a data line is owned by an associated L1 cache, and a modified value that indicates whether or not the data line is in a modified state.

Additionally, the enhanced L1 cache directory entry includes a valid value indicating whether or not the data line is valid for use by the L1 cache, and a tag value identifying the particular data line. One example of an embodiment of an enhanced L1 cache directory entry, e.g., enhanced L1 cache directory entry 236A, is further described with reference to FIG. 3.

Figure 3:
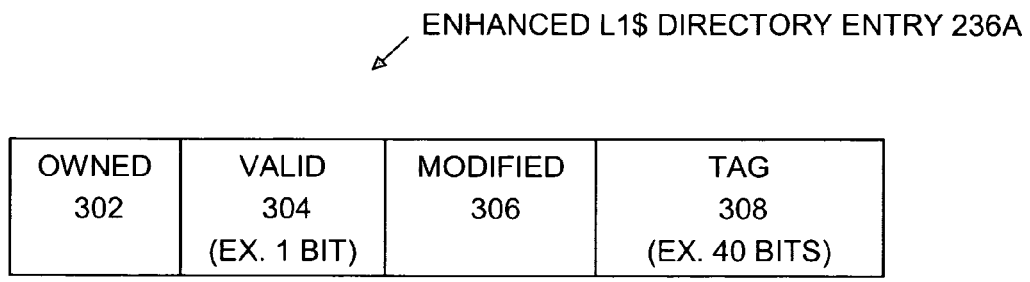
FIG. 3 illustrates a block diagram of the enhanced L1 cache directory entry of FIG. 2 in accordance with one embodiment of the invention.

FIG. 3 illustrates a block diagram of enhanced L1 cache directory entry 236 of FIG. 2 in accordance with one embodiment of the invention. Referring now to FIG. 3, in one embodiment, enhanced L1 cache directory entry 236A includes at least a valid value 304, i.e., valid 304, a tag value 308, i.e., tag 308, and, different from a conventional L1 cache directory entry, an owned value 302, i.e., owned 302, and modified value 306, i.e., modified 306.

As earlier described, a valid value, e.g., valid 304, for example, one (1) bit, indicates whether or not the associated data line is valid for use by the L1 cache. For example, a valid value 304 of one (1) indicates the data line is valid for use by the associated L1 cache, and a valid value 304 of zero (0) indicates the data line is not valid for use by the L1 cache and needs to be updated prior to use. Also as earlier described, a tag value, i.e., tag 308, for example, forty (40) bits, identifies an associated data line, and the location of the data line in the L1 cache.

In one embodiment, owned value 302 is a value, for example, one (1) bit, indicating whether or not the associated data line is owned by the L1 cache. For example, in one embodiment, when L1 cache 204 [0] owns the data line, owned value 302 is set to one (1) and indicates the associated data line is owned by L1 cache 204 [0]. Alternatively, when L1 cache 204 [0] does not own the data line, owned value 302 is set to zero (0), and indicates the associated data line is not owned by L1 cache 204 [0], and thus is owned by shared L2 cache 220.

The present example value convention as used herein is for purposes of description of the invention, and is not intended to limit the invention to the examples described herein. Thus, it can be understood by those of skill in the art that the above exemplary value convention can be reversed, or that an entirely different value convention can be used.

In one embodiment, modified value 306 is a value, such as one (1) or more bits, that indicates whether the data line has been modified. For example, a modified value 306 of one (1) indicates the data line has been modified, and a modified value 306 of zero (0) indicates the data line has not been modified. In one embodiment, there is at least one enhanced L1 cache directory entry, e.g., enhanced L1 cache directory entry 236A, generated in an L1 cache for each data line stored in that L1 cache.

Referring back again to FIG. 2, in the present embodiment, enhanced CMP 104A also includes a shared second level cache, herein termed a shared L2 cache, which is shared by processor cores 232 [0]-232 [N]. Processor cores 232 [0]-232 [N] are communicatively coupled with shared L2 cache 220 via a crossbar 218.

In one embodiment, shared L2 cache 220 includes one or more L2 cache banks 222A-222N. Each L2 cache bank 222A-222N further includes an L2 cache directory and an L2 cache data store. For example, L2 cache bank 222A includes an L2 cache directory 226A and an L2 cache data store 224A.

In one embodiment, shared L2 cache 220 includes at least one enhanced L2 cache directory entry, e.g., enhanced L2 cache directory entry 234, that identifies a data line stored in enhanced CMP 104A. More particularly, in one embodiment, L2 cache 220 includes an enhanced L2 cache directory entry for each data line stored in shared L2 cache 220 and/or in an L1 cache 204 [0]-204 [N]. For example, as illustrated in FIG. 2, L2 cache directory 234A includes an enhanced L2 cache directory entry 226A.

In one embodiment, the enhanced L2 cache directory entry, e.g., enhanced L2 cache directory entry 234A, includes a L1 cache owned value that indicates whether or not a data line is owned by an L1 cache, and a cache mask value, herein also referred to as a cache mask, that indicates a storage state of the associated data line in L1 caches 204 [0]-204 [N]. Additionally, the enhanced L2 cache directory entry includes a memory coherence protocol (MCP) value, indicating a memory coherence protocol state of the data line, and a tag value identifying the particular data line.

In some embodiments, enhanced L2 cache directory entry 234 includes a predictor value, i.e., predictor 310, used in predicting use of the data line by L1 caches 204 [0]-204 [N]. One example of an embodiment of an enhanced L2 cache directory entry, e.g., enhanced L2 cache directory entry 234, is further described with reference to FIG. 4.

Figure 4:
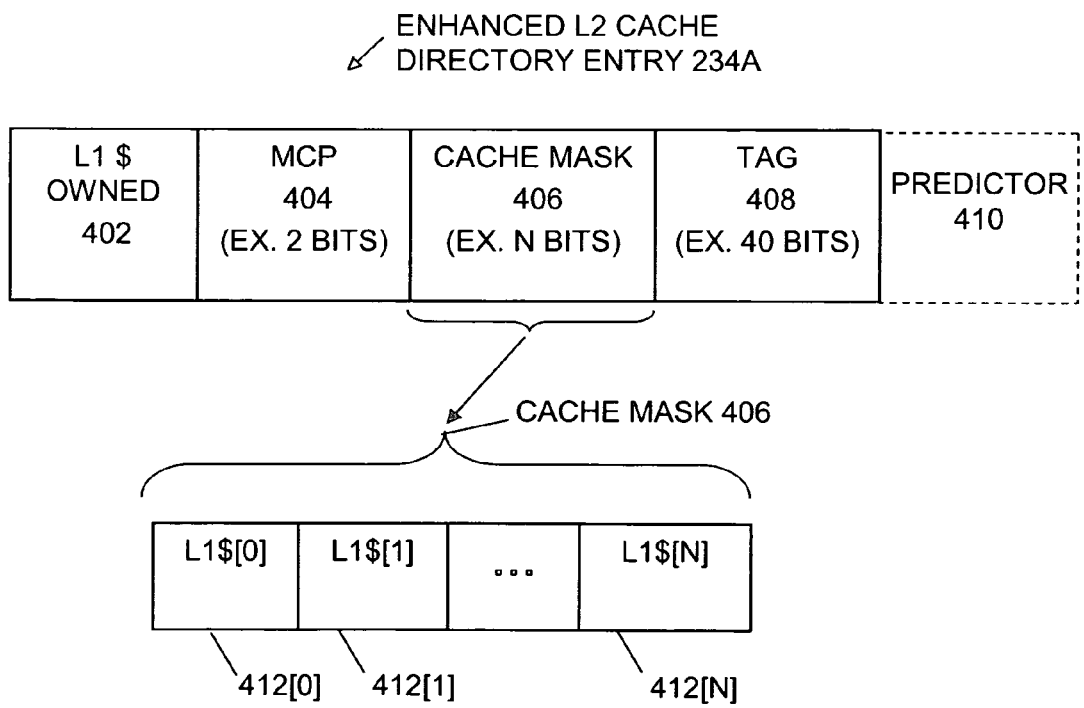
FIG. 4 illustrates a block diagram of the enhanced L2 cache directory entry of FIG. 2 in accordance with one embodiment of the invention.

FIG. 4 illustrates a block diagram of enhanced L2 cache directory entry 234 of FIG. 2 in accordance with one embodiment of the invention. Referring now to FIG. 4, in one embodiment, enhanced L2 cache directory entry 234A includes at least a memory coherence protocol (MCP) value 404, i.e., MCP 404, a tag value 408, i.e., tag 408, and, different from a conventional L2 cache directory entry, an L1 cache owned value 402, i.e., L1$ owned 402, and a cache mask value 406, i.e., cache mask 406. In some embodiments, enhanced L2 cache directory entry 234A further includes an optional predictor value 410, i.e., predictor 410.

As earlier described, an MCP value, i.e., MCP 404, indicates one or more memory coherence states of a data line in accordance with a particular cache memory coherence protocol, e.g., MOESI, MSI, MESI, and MOSI protocols. For example, typically the MOESI protocol uses a multi-bit MCP value to indicate a state of a data line as either: modified, owned, exclusive, shared, or invalid.

Herein the present invention is described with reference to the MOESI protocol, however, this is for purposes of description of the invention, and is not intended to limit the invention to the example described herein. Those of skill in the art can understand that other memory coherency protocols can also be used in the present invention, e.g., MSI, MESI, and MOSI protocols, and that different MCP values can be used. Also as earlier described, a tag value, i.e., tag 408, for example, forty (40) bits, identifies an associated data line, and the location of the data line in a cache.

In one embodiment, L1 cache owned value 402 is a value, for example, 1 bit, indicating whether or not the associated data line is owned by an L1 cache, e.g., by an L1 cache 204 [0]-204 [N]. For example, in one embodiment, an L1 cache owned value 402 set to one (1) indicates the associated data line is owned by one of L1 caches 204 [0]-204 [N], and thus is not owned by shared L2 cache 220. Alternatively, an L1 cache owned value 402 set to zero (0), indicates the associated data line is not owned by one of L1 caches 204 [0]-204 [N], and thus is owned by shared L2 cache 220.

The present example value convention as used herein is for purposes of description of the invention, and is not intended to limit the invention to the example described herein. Thus, it can be understood by those of skill in the art that the above exemplary value convention can be reversed, or that an entirely different value convention can be used.

In one embodiment, cache mask value 406 includes one or more L1 cache values 412 [0]-412 [N]. In one embodiment, each L1 cache value 412 [0]-412 [N] is associated with a different respectively corresponding L1 cache 204 [0]-204 [N] in enhanced CMP 104A, and indicates whether or not the data line is stored in an associated L1 cache 204 [0]-204 [N]. For example, L1 cache [0] value 412 [0] is a value, for example, one bit, indicating a storage state of a data line in L1 cache 204 [0]. As another example, L1 cache [1] value 412 [1] is a value, for example, one bit L[1], indicating a storage state of a data line in L1 cache 204 [1] (not separately shown in FIG. 2, but indicated by the ellipses).

In an optional embodiment, enhanced L2 cache directory entry 234A further includes a predictor value 410, herein also referred to as a predictor 410. In one embodiment, predictor value 410 is one or more values, such as bit values, generated by enhanced CMP 104A, or by a predictive process utilized by enhanced CMP 104A, and used to predict whether a data line is likely to be used by one or more L1 caches 204 [0]-204 [N].

In some embodiments, predictor 410 includes one or more values used in conjunction with cache mask 406 to predict whether a data line is likely to be used by one or more L1 caches 204 [0]-204 [N]. An example of using one or more values of an L1 cache mask of an L2 cache directory entry to indicate a past use of a data line by one or more L1 caches of a processor is further described in U.S. patent application Ser. No. 11/472,141, by Yuan C. Chou, Santosh G. Abraham, and Lawrence A. Spracklen, filed Jun. 20, 2006, herein incorporated in its entirety by reference.

In one embodiment, there is at least one enhanced L2 cache directory entry, e.g., enhanced L2 cache directory entry 234A, generated in the shared L2 cache, e.g., shared L2 cache 220, for each data line stored enhanced CMP 104A, e.g., in an L1 cache 204 [0]-204 [N] and/or shared L2 cache 220 of enhanced CMP 104A. In one embodiment, enhanced CMP 104A includes a method for requesting ownership of a data line from the shared L2 cache by an L1 cache, a method for granting or denying ownership of a data line from a shared L2 cache to a requesting L1 cache, and a method for revoking ownership of a data line from an L1 cache, each further described herein.

Figure 5:
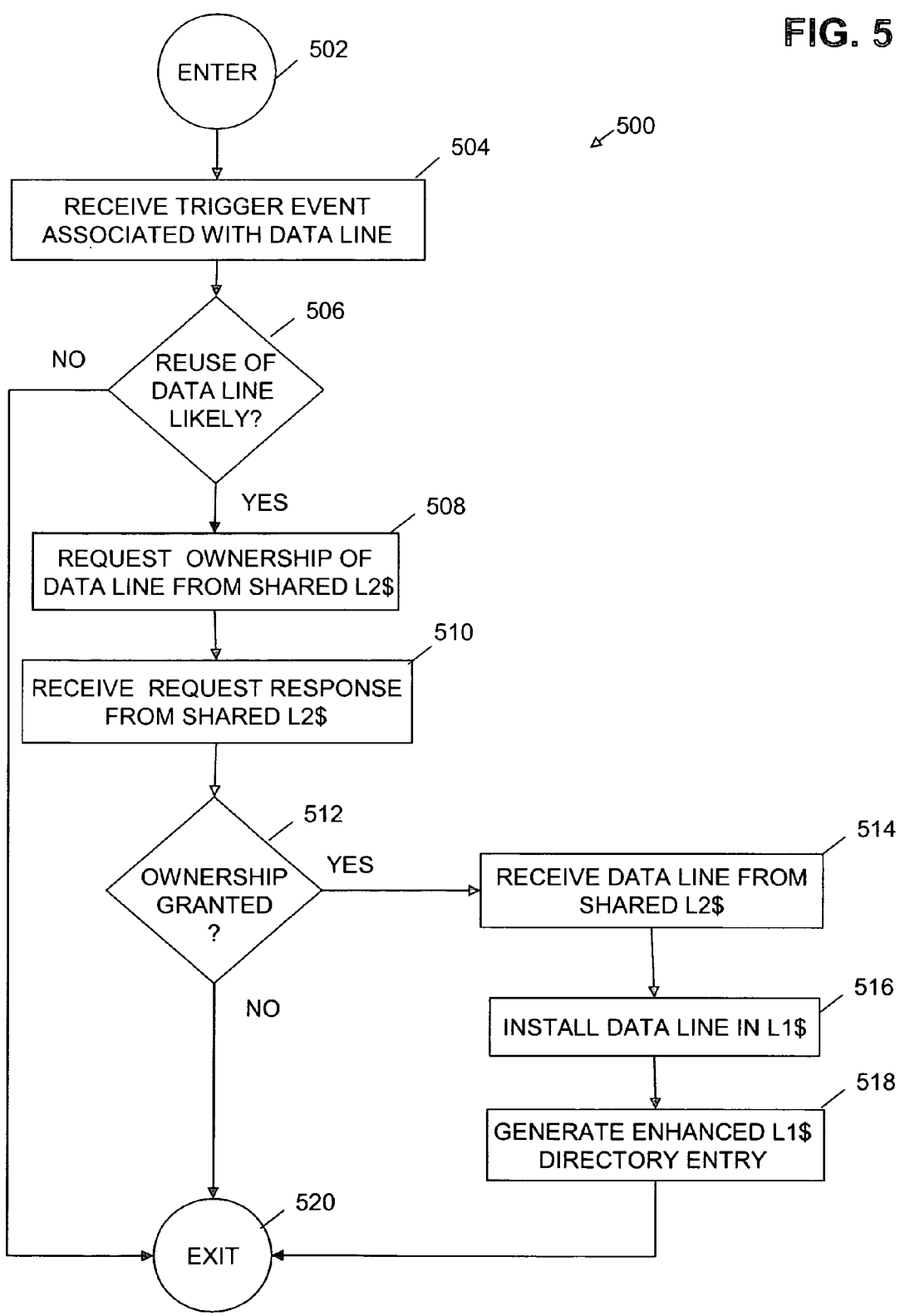
FIG. 5 illustrates a process flow diagram of a method for requesting ownership of a data line from a shared L2 cache by an L1 cache in accordance with one embodiment of the invention.

FIG. 5 illustrates a process flow diagram of a method 500 for requesting ownership of a data line from a shared L2 cache by an L1 cache in accordance with one embodiment of the invention. In the present embodiment, it is assumed that enhanced CMP 104A (FIG. 2) includes shared L2 cache 220, a requesting processor core, e.g., processor core 232 [0] having L1 cache 204 [0], and that enhanced CMP 104A further includes another processor core, a processor core 232 [1] having an L1 cache 204 [1] (not shown). The present example is for purposes of example and description and is not intended to limit the invention to the example described herein.

Referring now to FIGS. 2, 3, 4 and 5 together, in one embodiment, execution of method 500 by enhanced CMP processor 104A results in the operations of method 500 as described below. In one embodiment, method 500 is implemented by an L1 cache 204 [0]-204 [N], such as by L1 cache 204 [0] of processor core 232 [0]. In one embodiment, method 500 is entered at an ENTER operation 502, and processing transitions from ENTER operation 502 to a RECEIVE TRIGGER EVENT ASSOCIATED WITH DATA LINE operation 504.

In RECEIVE TRIGGER EVENT ASSOCIATED WITH DATA LINE operation 504, a trigger event associated with a data line is received by an L1 cache, for example, by L1 cache 204 [0] of processor core 232 [0]. In one embodiment, a trigger event associated with a data line includes information identifying a data line, such as a request for a data line received from processor core 232 [0]. From RECEIVE TRIG- GER EVENT ASSOCIATED WITH DATA LINE processing transitions to a REUSE OF DATA LINE LIKELY check operation 506.

In REUSE OF DATA LINE LIKELY check operation 506, a determination is made whether or not it is likely, e.g. predicted, that the data line will be updated by another store. In one embodiment, a determination is made whether or not it is likely that the data line will be updated by another store, for example by the requesting processor core, e.g., processor core 232 [0]. In some embodiments, the likelihood is associated with a time period subsequent to check operation 506, for example, such as short time period subsequent to check operation 506.

In one embodiment, an algorithm, heuristic or other predictive method is utilized in method 500 to determine whether or not reuse of the data line for a store is likely. Upon a determination that reuse of the data line for another store is not likely ("NO"), processing transitions from REUSE OF DATA LINE LIKELY check operation 506 to an EXIT operation 520, with processing exiting method 500.

Alternatively, upon a determination that reuse of the data line for another store is likely ("YES"), processing transitions from REUSE OF DATA LINE LIKELY check operation 506 to a REQUEST OWNERSHIP OF DATA LINE FROM SHARED L2 CACHE operation 508.

In REQUEST OWNERSHIP OF DATA LINE FROM SHARED L2 CACHE operation 508, ownership of the data line is requested from the shared L2 cache, e.g., from shared L2 cache 220. For example, in one embodiment, an ownership request is generated by L1 cache 204 [0] and sent to shared L2 cache requesting ownership of the data line. In one embodiment, the request for ownership identifies the data line. From REQUEST OWNERSHIP OF DATA LINE FROM SHARED L2 CACHE operation 508, processing transitions to a RECEIVE REQUEST RESPONSE FROM SHARED L2 CACHE operation 510.

In RECEIVE REQUEST RESPONSE FROM SHARED L2 CACHE operation 510, a response to the request of operation 508 is received from the shared L2 cache, e.g., shared L2 cache 220. In one embodiment, the request response indicates whether or not ownership of the data line is granted, e.g., the request is granted or denied. From RECEIVE REQUEST RESPONSE FROM SHARED L2 CACHE operation 510, processing transitions to an ONWERSHIP GRANTED check operation 512.

In OWNERSHIP GRANTED check operation 512, a determination is made whether or not ownership of the data line from shared L2 cache is granted based on the request response received in operation 510. In one embodiment, when the request response received in operation 510 does not grant the ownership request, e.g., denies the ownership request ("NO"), from OWNERSHIP GRANTED check operation 512, processing transitions to EXIT operation 520, with processing exiting method 500.

Alternatively, in one embodiment, when the request response received in operation 510 grants the ownership request ("YES"), from OWNERSHIP GRANTED check operation 512, processing transitions to a RECEIVE DATA LINE FROM SHARED L2 CACHE operation 514.

In RECEIVE DATA LINE FROM SHARED L2 CACHE operation 514, in one embodiment, the data line is received from the shared L2 cache, e.g., from shared L2 cache 220. From RECEIVE DATA LINE FROM SHARED L2 CACHE operation 514, processing transitions to an INSTALL DATA LINE IN L1 CACHE operation 516.

In INSTALL DATA LINE IN L1 CACHE operation 516, the data line received in operation 514 is installed in a data store of the L1 cache. For example, the data line received in operation 514 is stored in D cache data store 214 [0] (FIG. 2). From INSTALL DATA LINE IN L1 CACHE operation 516, processing transitions to a GENERATE ENHANCED L1 CACHE DIRECTORY ENTRY operation 518.

In GENERATE ENHANCED L1 CACHE DIRECTORY ENTRY operation 518, in one embodiment, an L1 cache directory entry associated with the data line is generated in a directory of the L1 cache. For example, enhanced L1 cache directory entry 236 is generated in D cache directory 216 [0] indicating the storage of the data line in D cache data store 214 [0].

More particularly, referring now again to FIG. 4, an enhanced L1 cache directory entry, such as enhanced L1 cache directory entry 236, is generated in which owned field 302 indicates L1 cache 204 [0] has ownership of the data line. For example, the value stored in owned 302 is set to one (1) indicating ownership of the data line by L1 cache 204 [0]. From GENERATE ENHANCED L1 CACHE DIRECTORY ENTRY operation 518, processing transitions to EXIT operation 520 with processing exiting method 500.

Figure 8A:
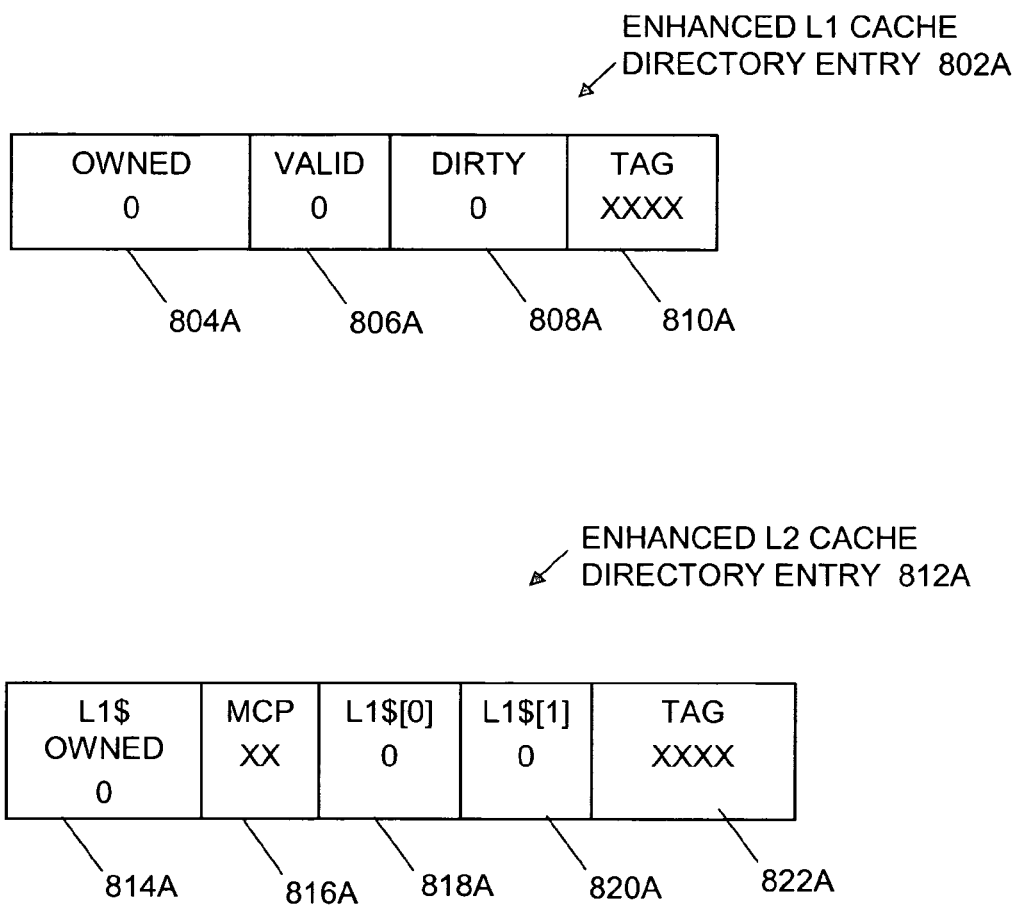
FIG. 8A illustrates an example of an enhanced L1 cache directory entry and an example of an enhanced L2 cache directory entry prior to an L1 cache receiving ownership of a data line in accordance with one embodiment of the invention.

FIG. 8A illustrates an example of an enhanced L1 cache directory entry 802A and an example of an enhanced L2 cache directory entry 812A prior to an L1 cache receiving ownership of a data line in accordance with one embodiment of the invention. More particularly, in one embodiment, FIG. 8A illustrates an example of an enhanced L1 cache directory entry 802A and an example of an enhanced L2 cache directory entry 812A prior to the associated L1 cache, for example, L1 cache 204 [0], requesting ownership of a data line.

In the present example, in one embodiment, owned value 804A is set to zero (0) indicating the data line is not owned by L1 cache 204 [0]. Further the L1 cache owned value 814A is set to zero (0) indicating the data line is not owned by L1 cache 204 [0] or by L1 cache 204 [1]. For purposes of description, it is assumed valid value 806A and dirty value 808A are set to 0 and that tag value 810A identifies the data line in entry 802A. Further, it is assumed L1 cache [0] value 818A and L1 cache [1] value 820A are set to 0; and, MCP value 816A identifies an MCP state and tag value 822A identifies the data line in entry 812A. When ownership of the associated data line is denied, the values remain unchanged. When ownership of the associated data line is granted, the values are changed as further described with reference to FIG. 8B.

Figure 8B:
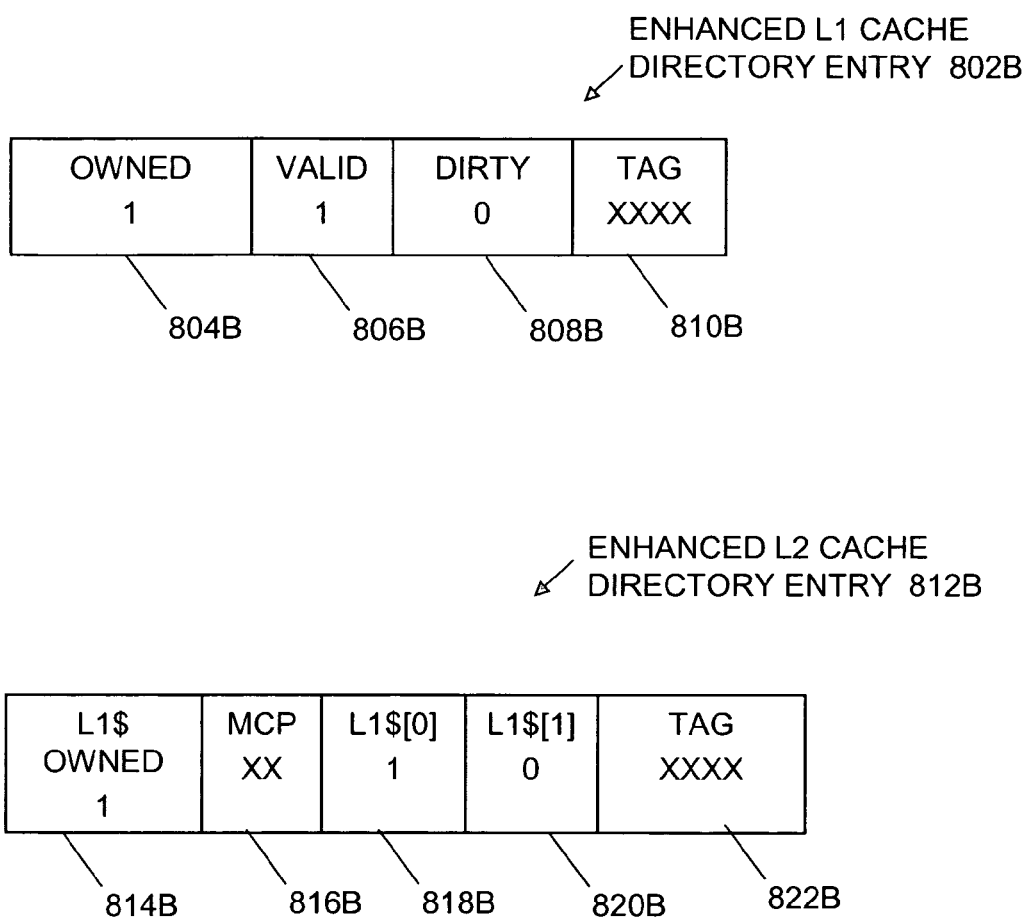
FIG. 8B illustrates an example of the enhanced L1 cache directory entry of FIG. 8A and an example of the enhanced L2 cache directory entry of FIG. 8A after receiving ownership of a data line and installing the received data line in an L1 cache in accordance with one embodiment of the invention.

FIG. 8B illustrates an example of an enhanced L1 cache directory entry 802B and an example of an enhanced L2 cache directory entry 812B after receiving ownership of a data line and installing the received data line in an L1 cache in accordance with one embodiment of the invention. More particularly, in one embodiment, FIG. 8B illustrates an example of an enhanced L1 cache directory entry 802B and an example of an enhanced L2 cache directory entry 812B after the associated L1 cache, for example, L1 cache 204 [0] requests ownership of a data line and the data line is received and installed in L1 cache 204 [0].

In the present example, in one embodiment, owned value 804B is set to one (1) indicating the data line is now owned by L1 cache 204 [0]. Further, L1 cache owned value 814B and valid value 806B are set to one (1) indicating the data line is now owned by an L1 cache, e.g., L1 cache 204 [0], and L1 cache [0] value 818B is set to one indicating the data line is present in L1 cache [0]. For purposes of description, it is assumed dirty value 808B and tag value 810B remain unchanged in entry 802B. Further, it is assumed L1 cache [1] value 820B, MCP value 816B, and tag value 822B remain unchanged in entry 812B.

Figure 6:
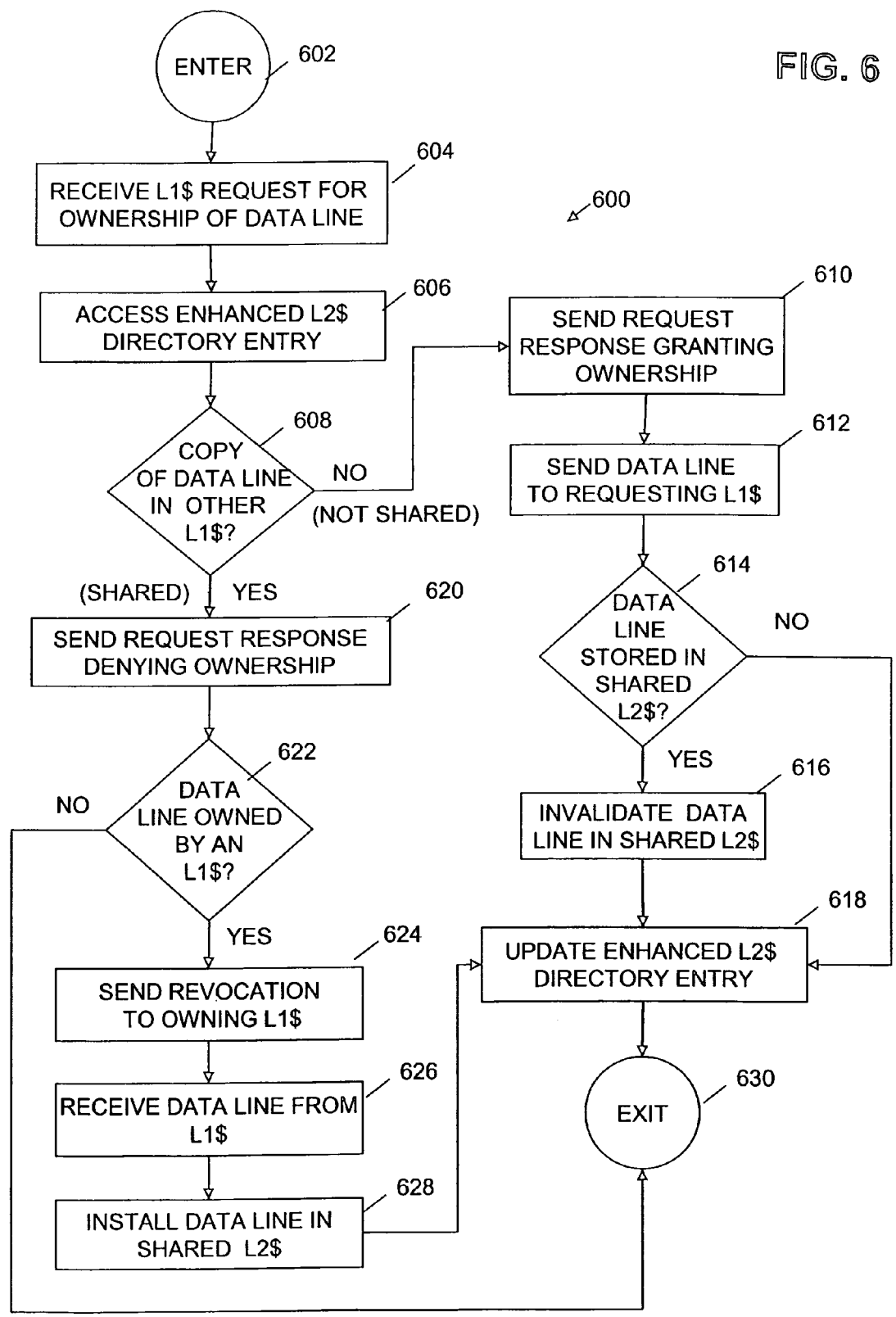
FIG. 6 illustrates a process flow diagram of a method for determining whether to grant ownership of a data line to a requesting L1 cache in accordance with one embodiment of the invention.

FIG. 6 illustrates a process flow diagram of a method 600 for determining whether to grant ownership of a data line to a requesting L1 cache in accordance with one embodiment of the invention. Continuing the example of FIG. 5, it is assumed that enhanced CMP 104A (FIG. 2) includes shared L2 cache 220, a requesting processor core, e.g., processor core 232 [0] having L1 cache 204 [0], and that enhanced CMP 104A further includes another processor core, e.g., processor core 232 [1] having an L1 cache 204 [1] (not shown). The present example is for purposes of description and is not intended to limit the invention to the example described herein.

Referring now to FIGS. 2, 3, 4 and 6 together, in one embodiment, execution of method 600 by enhanced CMP processor 104A results in the operations of method 600 as described below. In one embodiment, method 600 is entered at an ENTER operation 602, and processing transitions from ENTER operation 602 to a RECEIVE L1 CACHE REQUEST FOR OWNERSHIP OF DATA LINE operation 604.

In RECEIVE L1 CACHE REQUEST FOR OWNERSHIP OF DATA LINE operation 604, a request for ownership generated by an L1 cache is received by a shared L2 cache, e.g., shared L2 cache 220. For example, the ownership request sent in operation 508 of method 500 (FIG. 5) is received by shared L2 cache 220.

In the present embodiment, it is assumed that an entry is present for the data line and that the entry is assumed present. In instances where an entry for the data line is not present, optionally the request is denied, or the request is approved and the data line is loaded and acquired. From RECEIVE L1 CACHE REQUEST FOR OWNERSHIP OF DATA LINE operation 604, processing transitions to an ACCESS ENHANCED L2 CACHE DIRECTORY ENTRY operation 606.

In ACCESS ENHANCED L2 CACHE DIRECTORY ENTRY operation 606, an enhanced L2 cache directory entry associated with the data line identified in the ownership request is accessed. For example, enhanced L2 cache directory 234 in L2 cache directory 226A is accessed. From ACCESS ENHANCED L2 CACHE DIRECTORY ENTRY operation 606 processing transitions to a COPY OF DATA LINE IN OTHER L1 CACHE check operation 608.

In COPY OF DATA LINE IN OTHER L1 CACHE check operation 608, in one embodiment, a determination is made whether or not a copy of the data line is present in another L1 cache, i.e., in one or more L1 caches other than the L1 cache requesting the data line. For example, assuming L1 cache 204 [0] is requesting ownership of a data line, a determination is made whether or not a copy of the data line is present in L1 cache 204 [1].

In one embodiment, when a copy of the data line is not present in another L1 cache ("NO"), the data line is currently not shared by other L1 caches, e.g., not shared by L1 cache 204 [1], and processing transitions from COPY OF DATA LINE IN OTHER L1 CACHE check operation 608, to a SEND REQUEST RESPONSE GRANTING OWNERSHIP operation 610.

In SEND REQUEST RESPONSE GRANTING OWNERSHIP operation 610, a response to the request for ownership of the data line received in operation 604 is returned indicating the request is granted. For example, referring to FIG. 5, the request response from shared L2 cache 220 is received in operation 510. In one embodiment, shared L2 cache 220 generates the request response and sends the request response to the requesting L1 cache, e.g., L1 cache 204 [0].

In the present embodiment, it is assumed granting the request for ownership of the data line to the requesting L1 cache does not violate the memory coherence protocol, e.g., MOESI, for example, if the line is shared. In this situation, ownership should not be granted to the requesting L1 cache. Optionally, in this situation, the L2 cache can obtain ownership of the data line, and then grant ownership of the data line to the requesting L1 cache. From SEND REQUEST GRANTED operation 610, processing transitions to a SEND DATA LINE TO REQUESTING L1 CACHE operation 612.

In SEND DATA LINE TO REQUESTING L1 CACHE operation 612, the data line is obtained from the shared L2 cache, e.g., shared L2 cache 220, and sent to the requesting L1 cache, e.g., L1 cache 204 [0]. For example, in one embodiment the data is obtained, for example, from an off-chip memory structure, or from a data store of shared L2 cache 220, e.g., L2 cache data store 224A, and sent to the requesting L1 cache, e.g., L1 cache 204 [0]. In some embodiments, the request response granting ownership and the data line are communicated together to the requesting L1 cache. From SEND DATA LINE TO REQUESTING L1 CACHE operation 612, processing transitions to a DATA LINE STORED IN SHARED L2 CACHE check operation 614.

In DATA LINE STORED IN SHARED L2 CACHE check operation 614, in one embodiment, a determination is made whether or not the requested data line is stored in the shared L2 cache. For example, a determination is made whether or not the requested data line is stored in an L2 cache data store 224A-224N of shared L2 cache 220. In one embodiment, when the requested data line is stored in the shared L2 cache, as an L1 cache now owns the data line, the copy of the data line stored in the shared L2 cache needs to be invalidated. Thus, in one embodiment, when a copy of the data line is present in the shared L2 cache, processing transitions from DATA LINE STORED IN SHARED L2 CACHE check operation 614 to an INVALIDATE DATA LINE IN SHARED L2 CACHE operation 616.

In INVALIDATE DATA LINE IN SHARED L2 CACHE check operation 616, in one embodiment, the data line is invalidated in the shared L2 cache, e.g., in shared L2 cache 220. In one embodiment, the data line is deleted, or otherwise removed from shared L2 cache 220, thus freeing up space for other data line storage. From INVALIDATE DATA LINE IN SHARED L2 CACHE check operation 616, processing transitions to an UPDATE ENHANCED L2 CACHE DIRECTORY ENTRY operation 618.

In UPDATE ENHANCED L2 CACHE DIRECTORY ENTRY operation 618, in one embodiment, an associated enhanced L2 cache directory entry associated with the data line is updated to reflect ownership of the data line by the requesting L1 cache, and loss of ownership by the shared L2 cache.

For example, in one embodiment, referring now to FIG. 4, L1 owned field 402 is set to one (1) to indicate that an L1 cache has ownership of the data line. Further, in the present embodiment, L1 cache [0] mask value 412 [0] is set to one (1) and the remaining values of cache mask 406 remain set to zero (0) indicating the remaining L1 caches, e.g., L1 cache 204 [1], do not have the data line. From UPDATE ENHANCED L2 CACHE DIRECTORY ENTRY operation 618, processing transitions to an EXIT operation 630 with processing exiting method 600, or optionally returns to operation 604 on receipt of a next L1 cache request for ownership of a data line.

Referring now back again to DATA LINE STORED IN SHARED L2 CACHE check operation 614, alternatively, when the requested data line is not stored in the shared L2 cache, e.g., is not present in shared L2 cache 220 ("NO"), processing transitions from DATA LINE STORED IN SHARED L2 CACHE check operation 614, to UPDATE ENHANCED L2 CACHE DIRECTORY ENTRY check operation 618.

In UPDATE ENHANCED L2 CACHE DIRECTORY ENTRY operation 618, in this instance, as the data line was not present in the shared L2 cache, e.g., shared L2 cache 220, it is not necessary to invalidate the data line in shared L2 cache 220. Thus, for example, in one embodiment, referring now again to FIG. 4, L1 owned field 402 is set to one (1) to indicate that an L1 cache has ownership of the data line. Further, in the present embodiment, L1 cache [0] mask value 412 [0] is set to one (1) indicating L1 cache 204 [0] owns the data line, and the remaining values of cache mask 406 remain set to zero (0) indicating the remaining L1 caches, e.g., L1 cache 204 [1], do not have the data line. From UPDATE ENHANCED L2 CACHE DIRECTORY ENTRY operation 618, processing transitions to EXIT operation 630 with processing exiting method 600, or optionally returns to operation 604 on receipt of a next L1 cache request for ownership of a data line.

Referring now back again to COPY OF DATA LINE IN OTHER L1 CACHE check operation 608, alternatively, when a copy of the data is present in one or more other L1 caches ("YES"), the data line is a shared data line, and processing transitions from COPY OF DATA LINE IN OTHER L1 CACHE check operation 608, to a SEND REQUEST RESPONSE DENYING OWNERSHIP operation 620.

In SEND REQUEST RESPONSE DENYING OWNERSHIP operation 620, in one embodiment, a response to the request for ownership of the data line received in operation 604 is returned indicating the request is denied. For example, referring to FIG. 5, the request response from shared L2 cache is received in operation 510. From SEND REQUEST RESPONSE DENYING OWNERSHIP operation 620, processing transitions to a DATA LINE OWNED BY AN L1 CACHE check operation 622.

In DATA LINE OWNED BY AN L1 CACHE check operation 622, a determination is made whether or not the requested data line is owned by another L1 cache, e.g., in this example, L1 cache 204 [1]. In one embodiment, the enhanced L2 cache directory entry associated with the requested data line, e.g., enhanced L2 cache directory entry 234, is evaluated to determine whether or not the requested data line is owned by an L1 cache.

In particular in one embodiment, referring again to FIG. 4, the L1 cache owned value 402 is evaluated to determine whether or not the requested data line is owned by an L1 cache. For example, in one embodiment a determination is made whether or not the L1 cache owned value 402 is set to one (1) indicating ownership of the data line by an L1 cache. In some embodiments, cache mask 406 is also evaluated to determine which L1 cache owns the data line, e.g., by determining which value 412 [0]-412 [N] is set to one (1).

In one embodiment, when no L1 cache owns the data line, e.g., L1 cache owned value 402 is set to zero (0), ("NO"), from DATA LINE OWNED BY AN L1 CACHE check operation 622, processing transitions to EXIT operation 630 with processing exiting method 600, or optionally returns to operation 604 on receipt of a next L1 cache request for ownership of a data line.

Referring again back to DATA LINE OWNED BY AN L1 CACHE check operation 622, alternatively, when an L1 cache owns the data line, e.g., L1 cache owned value 302 is set to one (1) ("YES"), processing transitions from DATA LINE OWNED BY AN L1 CACHE check operation 622 to a SEND REVOCATION TO OWNING L1 CACHE operation 624.

In SEND REVOCATION TO OWNING L1 CACHE operation 624, in one embodiment a revocation of the data line ownership is sent to the owning L1 cache. Receipt of a revocation of ownership by an owning L1 cache and return of the data line to the shared L2 cache is further described herein with reference to FIG. 7. From SEND REVOCATION TO OWNING L1 CACHE operation 624, processing transitions to a RECEIVE DATA LINE FROM L1 CACHE operation 626.

In RECEIVE DATA LINE FROM L1 CACHE operation 626, in one embodiment, the requested data line is received from the owning L1 cache. Thus, the current data line is received by the shared L2 cache, e.g., shared L2 cache 220, from the previously owning L1 cache, in this example, L1 cache 204 [1]. From RECEIVE DATA LINE FROM L1 CACHE operation 626, processing transitions to an INSTALL DATA LINE IN SHARED L2 CACHE operation 628.

In INSTALL DATA LINE IN SHARED L2 CACHE operation 628, the data line received in operation 626 is installed in the shared L2 cache. For example, the data line is installed in an L2 cache data store 224A-224N of shared L2 cache 220. From INSTALL DATA LINE IN SHARED L2 CACHE operation 628, processing transitions to UPDATE ENHANCED L2 CACHE DIRECTORY ENTRY 618.

In UPDATE ENHANCED L2 CACHE DIRECTORY ENTRY 618, in this instance, as ownership of the data line was revoked from an owning L1 cache and installed in the shared L2 cache, an associated enhanced L2 cache directory entry is updated to indicate the revocation and installation. Thus, for example, in one embodiment, referring now again to FIG. 4, L1 cache owned field 402 is set to zero (0) to indicate that an L1 cache does not have ownership of the data line. Further in the present embodiment, the previously owning L1 cache [1] mask value 412 [1] is set to zero (0) indicating L1 cache 204 [1] does not own the data line, and the remaining values of cache mask 406 remain set to zero (0) indicating the remaining L1 caches, e.g., L1 cache 204 [0], do not have the data line. From UPDATE ENHANCED L2 CACHE DIRECTORY ENTRY operation 618, processing transitions to EXIT operation 630 with processing exiting method 600, or optionally returns to operation 604 on receipt of a next L1 cache request for ownership of a data line.

Figure 7:
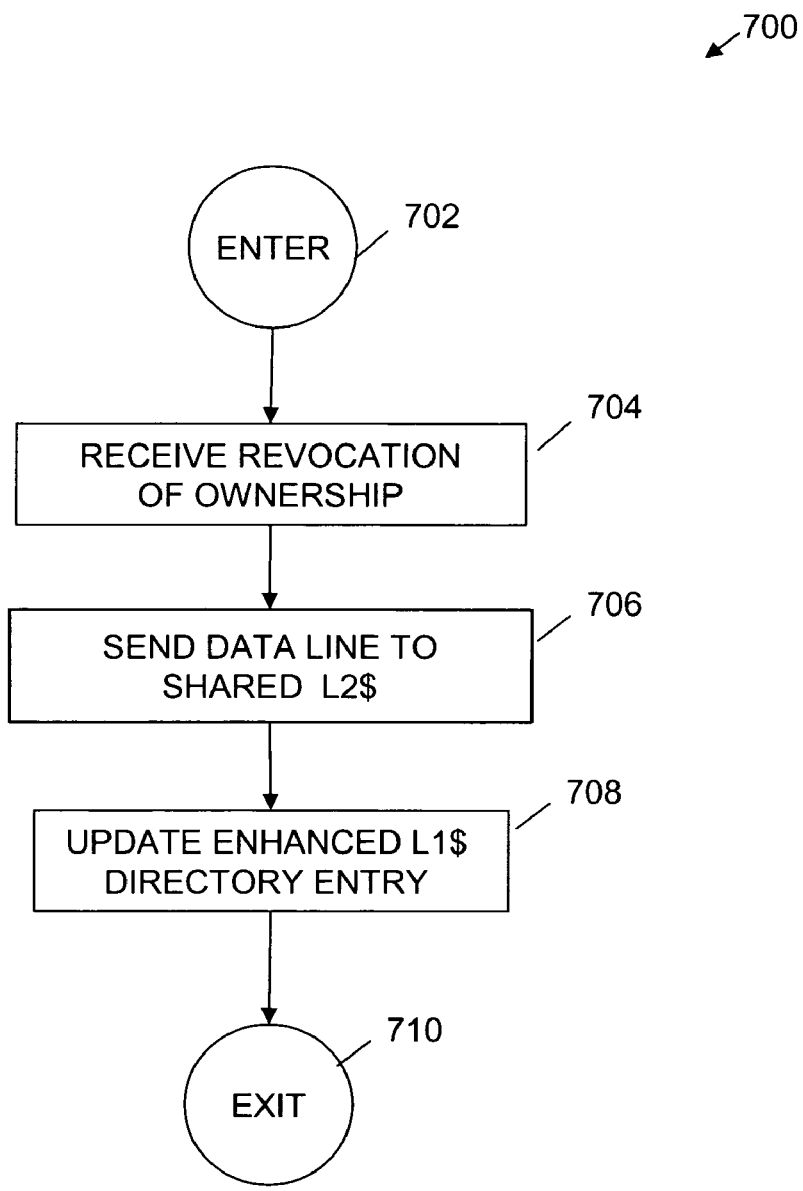
FIG. 7 illustrates a process flow diagram of a method for returning a revoked data line from an owning L1 cache to a shared L2 cache in accordance with one embodiment of the invention.

FIG. 7 illustrates a process flow diagram of a method 700 for returning a revoked data line from an owning L1 cache to a shared L2 cache in accordance with one embodiment of the invention. In the present embodiment, continuing the earlier examples, it is assumed that enhanced CMP 104A (FIG. 2) includes shared L2 cache 220, a requesting processor core, e.g., processor core 232 [0] having L1 cache 204 [0], and that enhanced CMP 104A further includes one other processor core, e.g., processor core 232 [1] having an L1 cache 204 [1] (not shown). The present example is for purposes of example and description and is not intended to limit the invention to the example described herein.

Referring now to FIGS. 2, 3, 4 and 7 together, in one embodiment, execution of method 700 by enhanced CMP processor 104A results in the operations of method 700 as described below. In one embodiment, method 700 is entered at an ENTER operation 702, and processing transitions from ENTER operation 702 to a RECEIVE REVOCATION OF OWNERSHIP operation 704.

In RECEIVE REVOCATION OF OWNERSHIP operation 704, in one embodiment, a revocation of ownership of a data line by a shared L2 cache is received at an owning L1 cache. For example, in one embodiment, a revocation of ownership of a data line by shared L2 cache 220 is received by owning L1 cache 204 [1]. In one embodiment, the revocation identifies the data line. From RECEIVE REVOCATION OF OWNERSHIP operation 704, processing transitions to a SEND DATA LINE TO SHARED L2 CACHE operation 706.

In SEND DATA LINE TO SHARED L2 CACHE operation 706, the data line is obtained from the owning L1 cache, and sent to the shared L2 cache. For example, the data line is obtained from D cache data store 214 [1] and sent to shared L2 cache 220. From SEND DATA LINE TO SHARED L2 CACHE operation 706, processing transitions to an UPDATE ENHANCED L1 CACHE DIRECTORY ENTRY operation 708.

In UPDATE ENHANCED L1 CACHE DIRECTORY ENTRY operation 708, in one embodiment, an enhanced L1 cache directory entry associated with the data line is updated in the previously owning L1 cache. For example, in one embodiment, enhanced L1 cache directory entry 236 (FIG. 2) associated with the data line in L1 cache 204 [1] is updated to reflect the loss of ownership by L1 cache 204 [1].

For example, referring again to FIG. 3, owned value 302 of enhanced L1 cache directory entry 236A is set to zero (0) indicating that L1 cache 204 [1] does not own the associated data line. From UPDATE ENHANCED L1 CACHE DIRECTORY ENTRY operation 708, processing transitions to an EXIT operation 710 with processing exiting method 700, or optionally returns to operation 704 on receipt of a next receipt of a revocation of ownership of a data line.

Figure 9A:
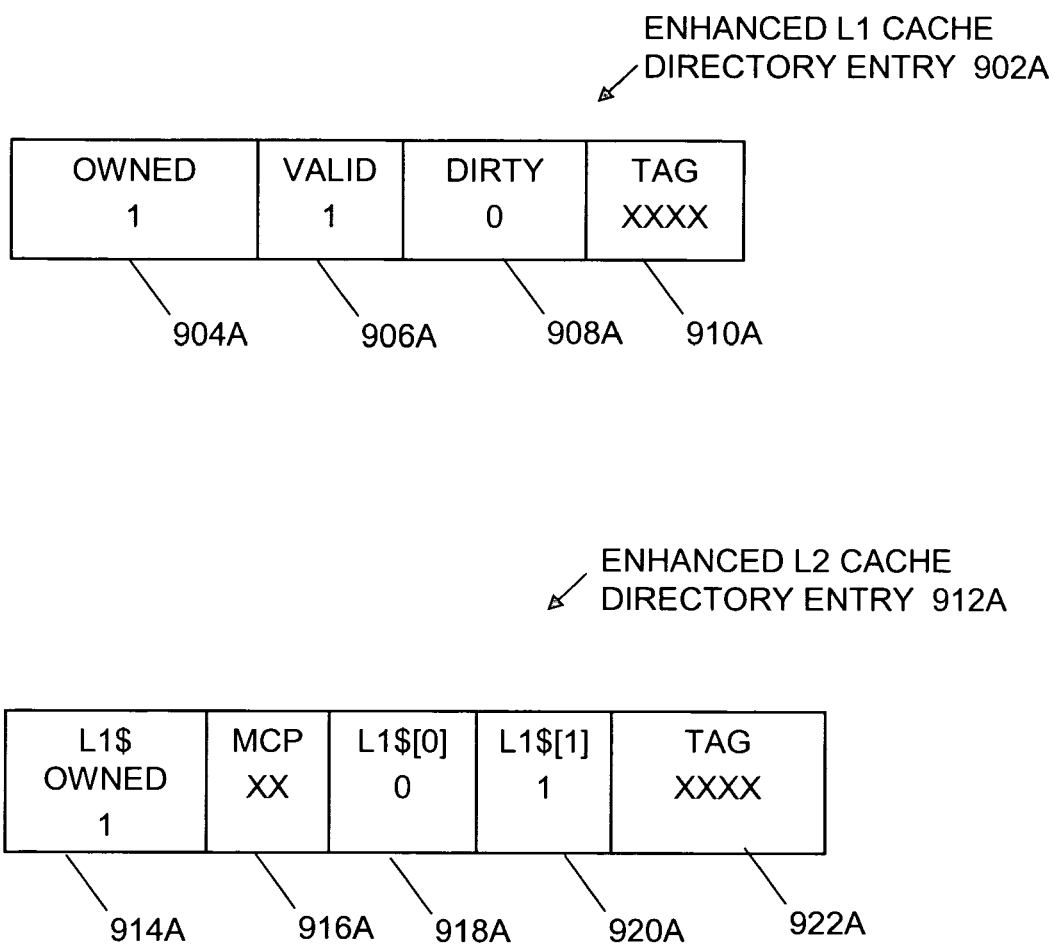
FIG. 9A illustrates an example of an enhanced L1 cache directory entry and an example of an enhanced L2 cache directory entry prior to a revocation of ownership of a data line owned by the associated L1 cache in accordance with one embodiment of the invention.

FIG. 9A illustrates an example of an enhanced L1 cache directory entry 902A and an example of an enhanced L2 cache directory entry 912A prior to a revocation of ownership of a data line owned by the associated L1 cache in accordance with one embodiment of the invention. More particularly, in one embodiment, FIG. 9A illustrates an example of an enhanced L1 cache directory entry 902A and an example of an enhanced L2 cache directory entry 912A prior to the shared L2 cache, for example, shared L2 cache 220, revoking ownership of the data line from the owning L1 cache, in this example, L1 cache 204 [1].

In the present example, in one embodiment, owned value 904A of enhanced L1 cache directory entry 902A is set to one (1) indicating the data line is owned by L1 cache 204 [1].

Further, the L1 cache owned value 914A in the enhanced L2 cache directory entry 912A is set to one (1) indicating the data line is owned by an L1 cache 204 [0]-204 [1]. For purposes of description, it is assumed valid value 906A is set to one, dirty value 908A is set to 0 and that tag value 910A identifies the data line in entry 902A. Further, it is assumed L1 cache [0] value 918A is set to zero, L1 cache [1] value 920A is set to 1; and, MCP value 916A identifies an MCP state and tag value 922A identifies the data line in entry 912A. When ownership of the associated data line is revoked the values are changed as further described with reference to FIG. 9B.

Figure 9B:
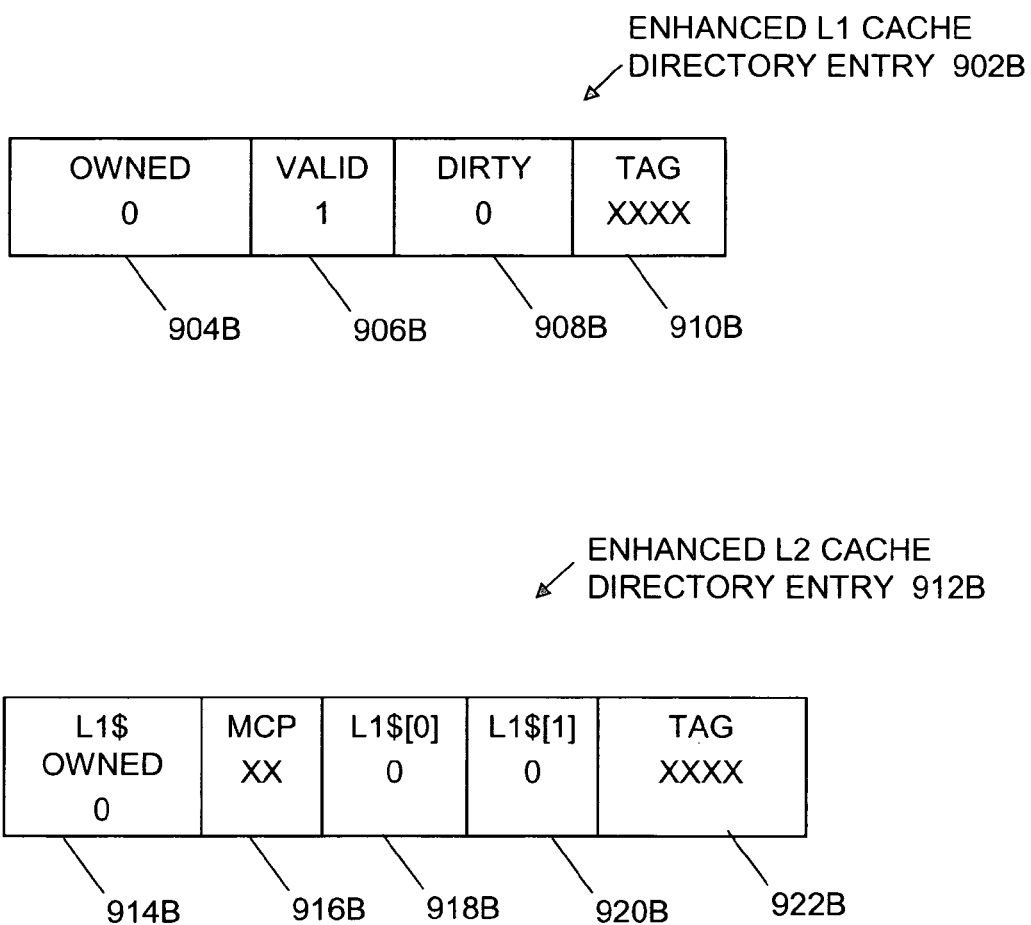
FIG. 9B illustrates an example of the enhanced L1 cache directory entry of FIG. 9A and an example of the enhanced L2 cache directory entry of FIG. 9A after revocation of the ownership of the data line and installation of the data line in a shared L2 cache in accordance with one embodiment of the invention.

FIG. 9B illustrates an example of an enhanced L1 cache directory entry 902B and an example of an enhanced L2 cache directory entry 912B after revocation of the ownership of the data line and installation of the data line in a shared L2 cache in accordance with one embodiment of the invention. More particularly, in one embodiment, FIG. 9B illustrates an example of an enhanced L1 cache directory entry 902B and an example of an enhanced L2 cache directory entry 912B after the revocation of ownership of a data line from an L1 cache. For example, shared L2 cache 220 revokes ownership of a data line from L1 cache 204 [1] and the data line is sent from L1 cache 204 [1] and installed in shared L2 cache 220.

In the present example, in one embodiment, owned value 904B of enhanced L1 cache directory entry 902B is set to zero (0) indicating the data line is not owned by L1 cache 204 [1]. Further, L1 cache [1] value 920B is set to zero (0), and the L1 cache owned value 914B is set to zero (0) indicating the data line is not owned by an L1 cache, and thus is owned by shared L2 cache 220. For purposes of description, it is assumed valid value 906B, dirty value 908B and tag value 910B remain unchanged in entry 902B. Further, it is assumed, L1 cache [0] value 918B, MCP value 916B, and tag value 922B remain unchanged in entry 912B.

Embodiments in accordance with the invention facilitate efficient data communication and data sharing among the processor cores of a CMP via the shared L2 cache and concurrently reduce the competition among the processor cores for space in the shared L2 cache for storage of private data.

This disclosure provides exemplary embodiments of the present invention. The scope of the present invention is not limited by these exemplary embodiments. Numerous variations, whether explicitly provided for by the specification or implied by the specification or not can be implemented by one of skill in the art in view of this disclosure.

What is claimed is:

1. An enhanced chip multiprocessor comprising:
a plurality of processor cores, each of said plurality of processor cores further comprising:
at least one first level (L1) cache; said at least one L1 cache including:
at least one enhanced L1 cache directory entry associated with a L1 cache data line stored in said enhanced chip multiprocessor, said enhanced L1 cache directory entry including:
a L1 cache owned value indicating whether said L1 cache data line is owned by the at least one L1 cache of a processor core of said plurality of processor cores;
a L1 cache valid value indicating whether said L1 cache data line is valid for use by the at least one L1 cache of the processor core of said plurality of processor cores;
a L1 cache modified value indicating whether said L1 cache data line has been modified; and
a tag value identifying said L1 cache data line; and
at least one shared second level (L2) cache, said at least one shared L2 cache communicatively coupled with each of said plurality of processor cores, said shared L2 cache further comprising:
at least one enhanced second level (L2) cache directory entry associated with a L2 cache data line stored in said enhanced chip multiprocessor, said enhanced L2 cache directory entry comprising:
a first level (L1) cache owned value indicating whether said L2 cache data line is owned by at least one L1 cache of a processor core of said plurality of processor cores, and
a first level (L1) cache mask value, said L1 cache mask value indicating a storage state of said L2 cache data line in an L1 cache of each of said plurality of processor cores;
a memory coherence protocol value identifying a state of said L2 cache data line in accordance with an associated memory coherence protocol;
one or more predictor values used in conjunction with the first level (L1) cache mask value to predict the use of said L2 cache data line by at least one L1 cache of at least one of said plurality of processor cores; and
a tag value identifying said L2 cache data line.

2. The enhanced chip multiprocessor of claim 1, wherein said L1 cache mask value further comprises:
a plurality of first level (L1) cache values, each of said plurality of L1 cache values associated with a different L1 cache of each of said plurality of processor cores.

3. An enhanced chip multiprocessor comprising:
means for receiving a request for ownership of a data line from a first level (L1) cache;
means for determining whether to grant said request for ownership of said data;
means for denying ownership of said data line to said L1 cache;
means for granting ownership of said data line to said L1 cache;
means for sending said data line from a shared second level (L2) cache to said L1 cache;
means for generating an enhanced second level (L2) cache directory entry associated with said data line in said shared L2 cache indicating ownership of said data line by said L1 cache said enhanced second level (L2) cache directory entry including a memory coherence protocol value identifying a state of said data line in accordance with an associated memory coherence protocol and a tag value identifying said data line, said enhanced second level (L2) cache directory entry including a first level (L1) cache mask value, said L1 cache mask value indicating a storage state of said L2 cache data line in an L1 cache of each of said plurality of processor cores, said enhanced second level (L2) cache directory entry including one or more predictor values used in conjunction with the first level (L1) cache mask value to predict the use of said L2 cache data line by at least one L1 cache of at least one of said plurality of processor cores; and
means for generating an enhanced first level (L1) cache directory entry associated with said data line in said L1 cache indicating ownership of said data line by said L1 cache.

4. The enhanced chip multiprocessor of claim 3 further comprising:
means for invalidating said data line in said shared L2 cache.

5. The enhanced chip multiprocessor of claim 3 further comprising:
means for revoking ownership of said data from said L1 cache;
means for sending said data line from said L1 cache to said shared L2 cache;
means for installing said data line in said shared L2 cache;
means for generating an enhanced L2 cache directory entry associated with said data line in said shared L2 cache indicating ownership of said data line by said L2 cache; and
means for generating an enhanced L1 cache directory entry associated with said data line in said L1 cache indicating said data line is not owned by said L1 cache.

6. The enhanced chip multiprocessor of claim 3, further comprising:
means for accessing said enhanced L2 cache directory entry associated with said data line;
means for determining whether a copy of said data line is stored in another L1 cache;
means for generating a request response granting ownership of said data line to said L1 cache;
means for generating a request response denying ownership of said data line to said L1 cache;
means for determining whether or not said data line is stored in said shared L2 cache; and
means for determining whether or not said data line is owned by another L1 cache.

* * * * *